Jan. 18, 1949. R. F. WILSON ET AL 2,459,752
FUEL CELL CONSTRUCTION
Filed Aug. 13, 1945

Inventor
ROBERT F. WILSON
AND
ANTONE F. REZNICEK

By
Attorneys

Patented Jan. 18, 1949

2,459,752

UNITED STATES PATENT OFFICE 2,459,752

FUEL-CELL CONSTRUCTION

Robert F. Wilson, San Gabriel, and Antone F. Reznicek, Alhambra, Calif., assignors to The Firestone Tire & Rubber Company, Akron, Ohio, a corporation of Ohio Application August 13, 1945, Serial No. 610,564

2 Claims. (Cl. 285—38)

This invention relates to fittings for fuel cells. More particularly, it relates to the combination of (1) a bullet-sealing fuel cell provided with a synthetic-rubber fitting having an opening therethrough and (2) an attachment with an opening therethrough in register with the opening in the fitting and with a lip which extends down into the opening in the fitting.

It has been found advantageous for various reasons to utilize synthetic-rubber fittings in bullet-sealing fuel cells or gasoline tanks. These fittings have been made of oil-resistant synthetic rubbers, such as Buna N, neoprene, etc. When an attachment is bolted tight to such a fitting, the synthetic rubber is forced out around the outer edge of the attachment and also flows into the opening at the center of the fitting. The bulge of synthetic-rubber stock thus formed in the opening is under tension; and, therefore, when in contact with fuel, it splits and opens up, causing failure of the fitting and loss of torque. This ultimately causes a leakage of fuel around the fitting.

According to the present invention an attachment is used which is provided with a lip which extends down into the opening in the fitting and prevents the stock from bulging into this opening when the attachment is bolted down tight against the fitting. The fitting is provided with bolt-securing means embedded therein and preferably in a ring which is located close to the opening in the fitting and close to the seat for the attachment. This provides only a thin layer of cushioning material over the surface of the ring. The ring is advantageously larger in diameter than the outer edge of the seat of the attachment which rests on the fitting. This prevents the possibility of the rubber being pinched in the way it might if the seat were larger than the ring.

The arrangement provided by this invention prolongs the life of the fitting, prevents the loss of torque, and eliminates at least some of the causes of leakage inherent in the prior-art structures.

The attachment may be a nipple, etc. It may be of metal or plastic construction.

The invention will be further described in connection with the accompanying drawings, in which.

Figure 1:
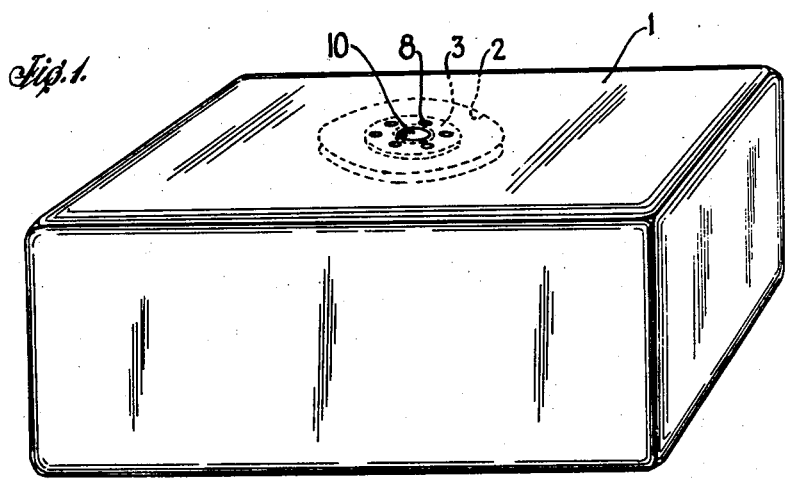
Fig. 1 illustrates in perspective a conventional fuel cell provided with a synthetic-rubber fitting.
Figure 2:
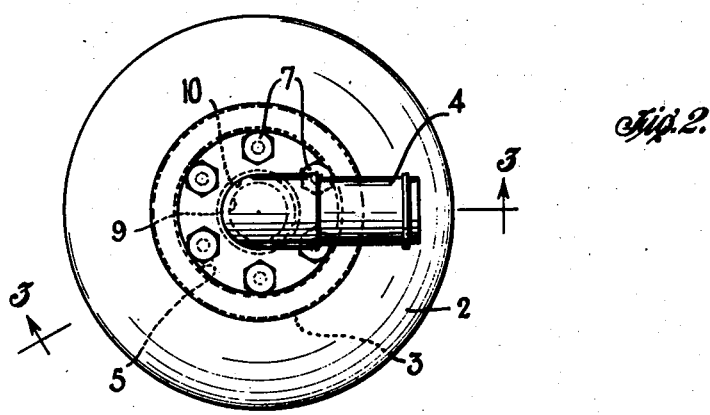
Fig. 2 is a plan view of the fitting with an attachment bolted in place over the fitting.
Figure 3:
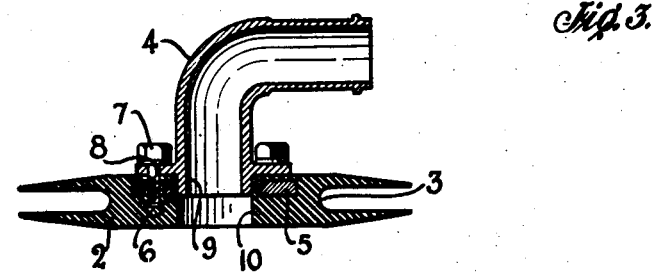
Fig. 3 is a section on the line 3—3 of Fig. 2.

In the drawings the fuel cell 1 is provided with the synthetic-rubber fitting 2, which may be of Buna N or the like. The walls of the fuel cell are built up of various plies of material. Several of these plies are cured in place in the U opening 3 in the periphery of the fitting, and, customarily, one or more plies of the bullet-sealing cell lie above and below the U opening. This type of seam is prepared before the fitting and the cell wall are cured. The two sides of the U opening are pressed together over the cell wall to form a firm bond between them and the cell wall. They may be cemented together with a curable cement where this is desirable. Then, on curing, the fitting and the wall of the fuel cell are formed into a unitary whole.

The attachment 4 is bolted to the fitting. The ring 5, embedded in the fitting, is provided with the dome nuts 6 into which the bolts 7 are fastened through suitable holes 8 in the synthetic rubber. The ring 5 is larger in diameter than the flange of the attachment through which the bolts pass. This precludes the type of pinching which would occur if the flange were larger than the ring 5.

The lip 9, which extends down into the opening 10 in the fitting to at least the level of the top of the ring 8, prevents the synthetic stock from flowing into the opening when the bolts are tightened. The ring 5 is located near the top of the fitting and also near the opening 10 so that there is only a thin cushion of rubber over it and at best there is not much flow. Any flow of the stock which does take place merely tightens the wall of the fitting around the outside of the lip. There is no such bulge of the stock under tension in the opening of the fitting as occurs when an attachment with no lip is employed, and the danger of destruction of the synthetic rubber due to attack of the fuel on the stock while under such tension is prevented.

The drawing is illustrative only. The fitting may be of any desired shape, and the attachment —whether of metal or plastic—may be of any shape and designed for any purpose. Any suitable means may be used for fastening the attachment to the fitting.

What we claim is:

1. In combination with a fuel cell provided with a synthetic-rubber fitting with an opening therethrough and having threaded means embedded therein for the reception of bolts, an attachment with a flange around the bottom thereof seated on the fitting with bolts passing through the flange and into said threaded means in the fitting, the attachment having an opening therethrough in register with the opening in the fitting and being provided with an annular lip around its opening which extends down into the opening in the fitting adjacent the wall thereof at least to the level of the top of said threaded means embedded in the fitting to prevent the synthetic rubber of the fitting bulging into the opening through the fitting when the attachment is drawn to the fitting by the bolts.

2. In combination with a fuel cell provided with a synthetic-rubber fitting with a circular opening therethrough and having embedded therein near its top and near the opening and concentric therewith, an annular ring with threaded openings therein, an attachment with a flange around the bottom thereof seated on the fitting with bolts passing through the flange and into said threaded openings in the ring, the attachment having an opening therethrough in register with the opening in the fitting and being provided with an annular lip which extends down into the opening in the fitting adjacent the wall thereof at least below the level of the top of the embedded ring and prevents the synthetic rubber of the fitting bulging into the opening through the fitting when the attachment is drawn to the fitting by the bolts and tightens the wall of the fitting around the outside of the lip.

ROBERT F. WILSON.
ANTONE F. REZNICEK.

REFERENCES CITED

The following references are of record in the file of this patent:

UNITED STATES PATENTS

| Number | Name | Date |
|---|---|---|
| 448,765 | Kaiser | Mar. 24, 1891 |
| 1,271,184 | Lucas | July 2, 1918 |
| 2,370,799 | Kelley | Mar. 6, 1945 |
| 2,391,373 | Wickstrum | Dec. 18, 1945 |